June 21, 1966  J. E. PARNELL  3,257,173
POLYMER FINISHING APPARATUS
Filed Aug. 23, 1960
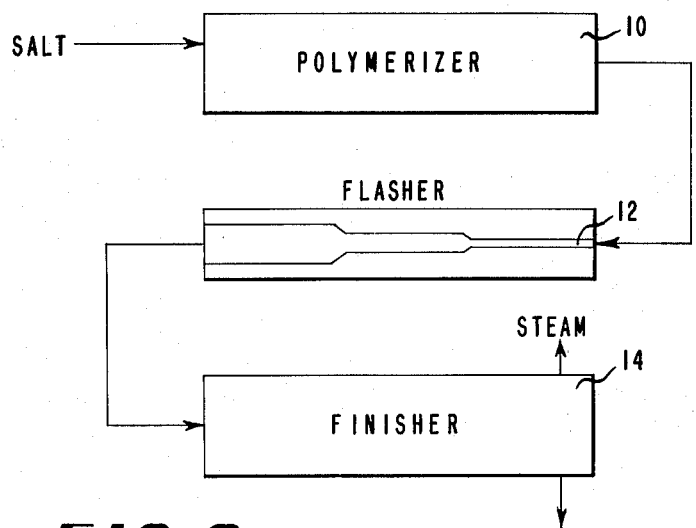
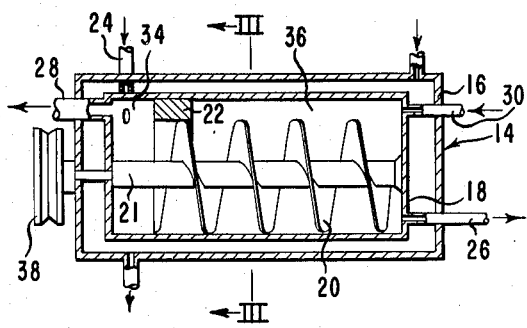
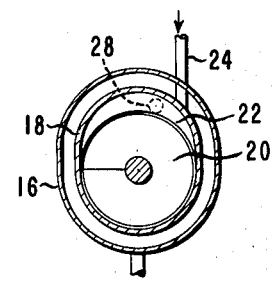
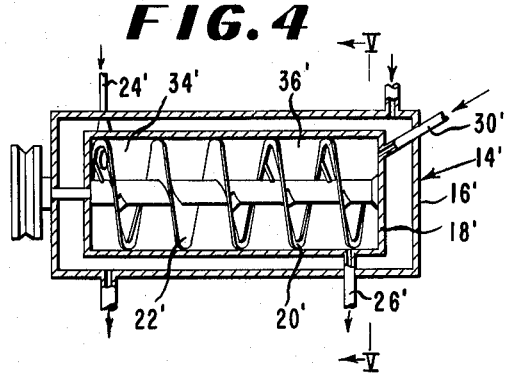
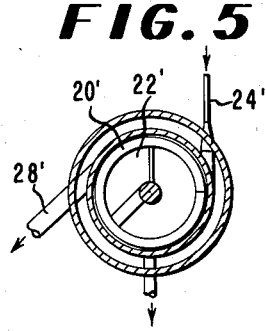

United States Patent Office 3,257,173
Patented June 21, 1966

3,257,173
POLYMER FINISHING APPARATUS
John Elzie Parnell, Chattanooga, Tenn., assignor to E. I. du Pont de Nemours and Company, Wilmington, Del., a corporation of Delaware
Filed Aug. 23, 1960, Ser. No. 51,321
3 Claims. (Cl. 23—285)

This invention relates generally to polyamides and more particularly to improvements in the process and apparatus employed in their production.

A suitable process for the continuous polymerization of polyamides from diamines and dibasic acids has been disclosed by Taylor in U.S. Patent 2,361,717. In the Taylor system, the use of a multiplicity of vessels permits a high degree of process flexibility. Although this system is suited to the production of polyamides of high molecular weight, it is unduly expensive in view of the large number of process vessels employed. A much simpler system in which a concentrated salt solution is partially polymerized and then flashed in a tube of constantly increasing diameter has been disclosed in British Patent 674,954. Steam is disengaged from the polymer and additional polymerization takes place in the flasher. The final polymerization stage involves the removal of liberated steam from a finishing apparatus at atmospheric pressure. Although the yarns produced from the resulting polyamide are suitable for textile uses, it is well known that there is continuing need for industrial yarns of higher strength and that one route to this objective is via the use of higher viscosity polymers. There are various expedients which may be employed in adapting the system disclosed in the British patent to this end. For example, the finishing apparatus may be operated under a vacuum. When this is done, the large volume of steam which must be removed is contaminated with entrained polymer. This overloads and may even lead to plugging of the vacuum system. Alternatively, inert gas may be used to dilute the steam atmosphere in the finishing apparatus but, due to the large volume of steam produced, a correspondingly large volume of inert gas is required. A third possibility is the addition of a second finishing vessel which is operated under a vacuum for the purpose of increasing molecular weight to the desired degree.

The most important object of the present invention is to provide process and apparatus improvements which, when incorporated into an otherwise conventional continuous polymerization system, substantially avoid the difficulties enumerated above and facilitate the production of higher tenacity yarns.

It is a specific object of the present invention to provide a reaction vessel in which steam separation and finishing stages may be accomplished without any interruption in or redirection of the polyamide flow through the vessel.

These and other objects are accomplished are accomplished with a polyamide-finishing apparatus comprised generally of a horizontal disposed hollow vessel having polyamide inlet and outlet conduits at the respective ends thereof. A spiral transfer means extends lengthwise of the vessel for moving molten polyamides toward the outlet conduit. A transversely disposed baffle means is provided for the purpose of dividing the space above the flowing polymer into separate zones from which steam is exited and into which an inert gas is introduced.

Other objectives will become apparent in the following specification wherein reference is made to the accompanying drawing in which:

FIGURE 1 is a diagrammatic illustration of the process into which the finishing apparatus of the present invention is incorporated;

FIG. 2 is a longitudinal sectional view through a preferred embodiment of the finishing apparatus of the invention;

FIG. 3 is a transverse sectional view taken on line III—III of FIG. 2;

FIG. 4 is a longitudinal sectional view through an alternate embodiment of the finishing apparatus; and FIG. 5 is a transverse sectional view taken on line V—V of FIG. 4.

The various stages or steps of the polymerization process to which the present disclosure is related have been illustrated diagrammatically in FIG. 1. In this process, concentrated hexamethylene diamomnium adipate solution is introduced into a polymerizer 10 and reacted under autogenous pressure to a low degree of polymerization. The polyamide is then discharged to a flasher tube 12 which has successive lengths of increasing diameter and in which the amidation temperature is maintained as the pressure is gradually reduced to atmospheric. In the flasher, steam is disengaged and additional polymerization takes place. Conventionally, final polymerization takes place with the removal of steam at atmospheric pressure in a finishing apparatus 14. The improvements disclosed herein are directed primarily to the finishing stages of the process.

As shown in FIGS. 2 and 3, the preferred embodiment of the finisher 14 includes generally, as components thereof, a fluid heating jacket 16, an elongated oval vessel 18, a spiral transfer means 20 in the form of a continuous solid screw, and a transversely disposed baffle means 22. The hollow vessel 18 has a polymer inlet conduit 24, a polymer outlet conduit 26, a steam outlet 28 and an inert gas inlet 30. Screw 20 is carried by a shaft 21, extends from adjacent the baffle 22 to the discharge end of vessel 18, and is off center in that it is situated in closely spaced relationship to the bottom of the conduit or vessel 18 leaving a void in the upper extremity of the vessel. The steam passageway or void is interrupted by the partition or baffle 22 which is lunar in cross section (FIG. 3) and has a thickness of at least one pitch of screw 20, measured parallel to the axis of finisher 14. Baffle 22 extends almost to the periphery of the screw.

In operation, a mixture of molten polyamide and steam is discharged from flasher 12 to finisher 14 through conduit 24. Disengaged steam exits through a zone 34 and the outlet 28. Omission of the initial section of the screw flight provides more disengagement space and thus leads to a more effective separation of steam from the entering polyamide. Inert gas is introduced under pressure at 30, sweeps through a zone 36 counter-current to the polyamide flow and, along with minor amounts of steam, passes baffle 22 to zone 34. Baffle 22 thus functions as a partial seal which prevents the flow of steam from zone 34 to zone 36. The polyamide is moved through vessel 18 by screw 20 which is driven by a pulley 38. In normal operation, vessel 18 is from one-third to two-thirds full of polyamide, leaving zones 34, 36 free for the passage of steam and inert gas. The inert gas is under sufficient pressure to insure that it will flow past the polymer barrier at baffle 22 and be exhausted through outlet 28.

In a nactual test, the polymerizer 10 was operated at 250 p.s.i.g. and the temperature was maintained at from 210–240° C. After a holdup time of three hours, the water and polymer mixture was flashed and passed to the finisher 14 which was maintained at 278° C. and into which the inert gas was added at the rate of 0.11 cubic ft./lb. polymer. The holdup time in the finisher was 55 minutes. A polyamide having a relative viscosity of 48.0 was produced, spun to yarn and drawn at a ratio of 5.24. The drawn yarn had a tenacity of 9.60 grams per denier. For purposes of comparison, another run was made under identical conditions except that a conventional straight pass finisher having no baffle and having the steam outlet located at the outlet end of the finisher was employed. No inert gas was added. The polyamide had a relative viscosity of 43.3 and the drawn yarn a tenacity of 9.33 grams per denier.

The alternate embodiment illustrated in FIGS. 4 and 5 differs from that which has been described above in that the vessel 18′ is round and the spiral transfer means 20′ is in the form of a ribbon flight. Such a ribbon flight scrapes the walls of the vessel 18′, dislodging gel-forming material, and permits steam removal through its open central portions. In this embodiment, at least one and one-half turns of the ribbon flight are connected to the shaft by a spiral web, presenting a solid screw in an intermediate length 22′. This web serves as a baffle means which prevents the flow of steam into the finishing zone 36′ in much the same fashion as has been described above in connection with baffle 22.

Polyamides for which the process of this invention is especially suitable are those polyamides made by the melt-condensation of dibasic acids and diamines. These polyamides are linear and fiber forming and are especially suitable for production of textile and industrial yarns. In addition, the process is suitable for the polymerization of amino-acid type polyamides, such as for example those prepared from 11-amino undecanoic acid. In general, the process improvement of this invention will usually not be necessary for preparation of polyamides from caprolactam, since the amount of water to be eliminated is small, and hence does not usually represent an undue load on the vacuum or inert gas finishing system. However, it may be used to advantage where relatively large amounts of water are present, e.g., as a catalyst, during the polymerization stage.

The finisher is conventionally operated at 275–285° C. but satisfactory results may be obtained at temperatures ranging from 225° C. to over 300° C., the lower limit being the melting point of the particular polyamide, and the upper limit being imposed by the polyamide decomposition temperature.

It is essential that the inert gas be free from oxygen, hence nitrogen, a carbon monoxide/carbon dioxide/nitrogen combination or rare gases such as helium, argon, neon and the like may be used. Ordinarily, the gas is preheated and supplied at a pressure exceeding the total pressure in the separation zone 34 by about one inch of water pressure.

The improvements of the invention have been disclosed herein as being useful in the production of polymers of higher viscosity. Alternatively, they may be employed advantageously in the production of polymers of intermediate viscosity at significantly increased throughput rates. It is apparent that various changes and modifications may be made in the polyamide-finishing apparatus disclosed herein without departing from the spirit of the present invention which is accordingly intended to be limited only by the scope of the appended claims.

Having thus described the invention, what is claimed as new and desired to be secured by Letters Patent is:

1. A polyamide-finishing apparatus comprising: an elongated, hollow vessel having polyamide inlet and outlet conduits adjacent opposite ends thereof; a driven shaft mounted for relative rotation in and extending lengthwise of the vessel, said shaft having thereon a continuous spiral transfer means for moving molten polyamide toward said outlet conduit; and baffle means positioned between said conduits, said vessel having a steam outlet adjacent said inlet conduit and an inert gas inlet adjacent the same end of the vessel as said outlet conduit, said baffle means being disposed transversely of said vessel in close proximity to said spiral transfer means as a partial seal between said steam and polyamide outlets.

2. The polyamide-finishing apparatus of claim 1 wherein said vessel is substantially oval in cross-section, said spiral transfer means is a solid screw situated in closely spaced relationship to the bottom of said vessel, and said baffle means is a partition extending from the top of said vessel into close proximity with the outer periphery of said screw.

3. The polyamide-finishing apparatus of claim 1 wherein said vessel is substantially round, said spiral transfer means is a ribbon flight, and said baffle means is a spiral web extending from the shaft to said flight in an intermediate length of the flight.

References Cited by the Examiner

UNITED STATES PATENTS

| | | | |
|---|---|---|---|
| 1,716,799 | 6/1929 | Sheffield | 23—252 X |
| 2,600,871 | 6/1952 | Helwig | 23—285 |
| 2,696,482 | 12/1954 | Pease | 260—78 |
| 2,766,222 | 10/1956 | Lum et al. | 260—78 |
| 2,894,824 | 7/1959 | Lanning | 23—285 |
| 2,937,079 | 5/1960 | Van Pool | 23—285 |

FOREIGN PATENTS 826,096  12/1959  Great Britain.

MORRIS O. WOLK, *Primary Examiner.*

MILTON STERMAN, JAMES H. TAYMAN, Jr.,
*Examiners.*

A. D. RICCI, *Assistant Examiner.*